United States Patent [19]
Hendriks

[11] Patent Number: 5,467,576
[45] Date of Patent: Nov. 21, 1995

[54] MACHINE FOR MAKING A PACKAGE OF FOOD CASING STRANDS

[75] Inventor: Ivo G. Hendriks, Overpelt, Belgium

[73] Assignee: Teepak, Inc., Westchester, Ill.

[21] Appl. No.: 146,866

[22] Filed: Nov. 4, 1993

Related U.S. Application Data

[63] Continuation-in-part of Ser. No. 966,961, Oct. 27, 1992, Pat. No. 5,328,031, which is a continuation-in-part of Ser. No. 907,007, Jul. 1, 1992, Pat. No. 5,228,572, which is a continuation-in-part of Ser. No. 696,436, May 6, 1991, Pat. No. 5,137,153.

[51] Int. Cl.⁶ .............................. B65B 1/22; B65B 43/26; B65B 53/00
[52] U.S. Cl. .................. 53/437; 53/441; 53/444; 53/459; 53/525; 53/149; 53/556; 53/563; 53/567; 53/575
[58] Field of Search ................ 53/437, 441, 444, 53/459, 525, 133.8, 149, 556, 563, 567, 575, 576, 577, 236

[56] References Cited

U.S. PATENT DOCUMENTS

| | | | |
|---|---|---|---|
| 1,447,715 | 3/1923 | Ekstrom et al. | 53/525 X |
| 3,212,381 | 10/1965 | Heyer | 53/133.8 |
| 3,974,628 | 8/1976 | Konstantin | 53/567 X |
| 4,203,269 | 5/1980 | Petersen | 53/525 X |
| 4,312,173 | 1/1982 | Killerman | 53/556 |
| 4,625,362 | 12/1986 | Kollross et al. | 53/576 X |
| 4,730,437 | 3/1988 | Benno | 53/567 X |
| 4,771,510 | 9/1988 | Kawai | 53/567 X |
| 5,356,007 | 10/1994 | Feldt | 53/444 X |

FOREIGN PATENT DOCUMENTS

| | | | |
|---|---|---|---|
| 118078 | 9/1979 | Japan | 53/149 |

*Primary Examiner*—Linda Johnson
*Attorney, Agent, or Firm*—Michael L. Dunn; Robert P. Simpson

[57] ABSTRACT

A machine for making a package of food casing strands, wherein the package has a hexagonal-like cross section, comprising a product holder for initially holding a plurality of the strands in a configuration having a hexagonal-like cross section, wherein the holder has an opening therein for admitting the strands into the holder; means for transporting the strands to the holder and for depositing the strands into the opening; shaker means for shaking the holder at predetermined times to ensure that the plurality of strands settle into the holder in the configuration having a hexagonal-like cross section; means for measuring and cutting a predetermined amount of stretch film, where the stretch film is a closed loop used to encase the package of food casing strands; means for stretching and holding the stretch film into a shape of a polygon having a perimeter which is larger than the perimeter of the holder; means for moving the stretched film into a position proximate the holder; means for pushing all of the strands out of the holder and into the stretched closed loop of film; and, means for releasing the stretched film, wherein the film then relaxes about the plurality of strands to form the package of food casing strands.

9 Claims, 10 Drawing Sheets

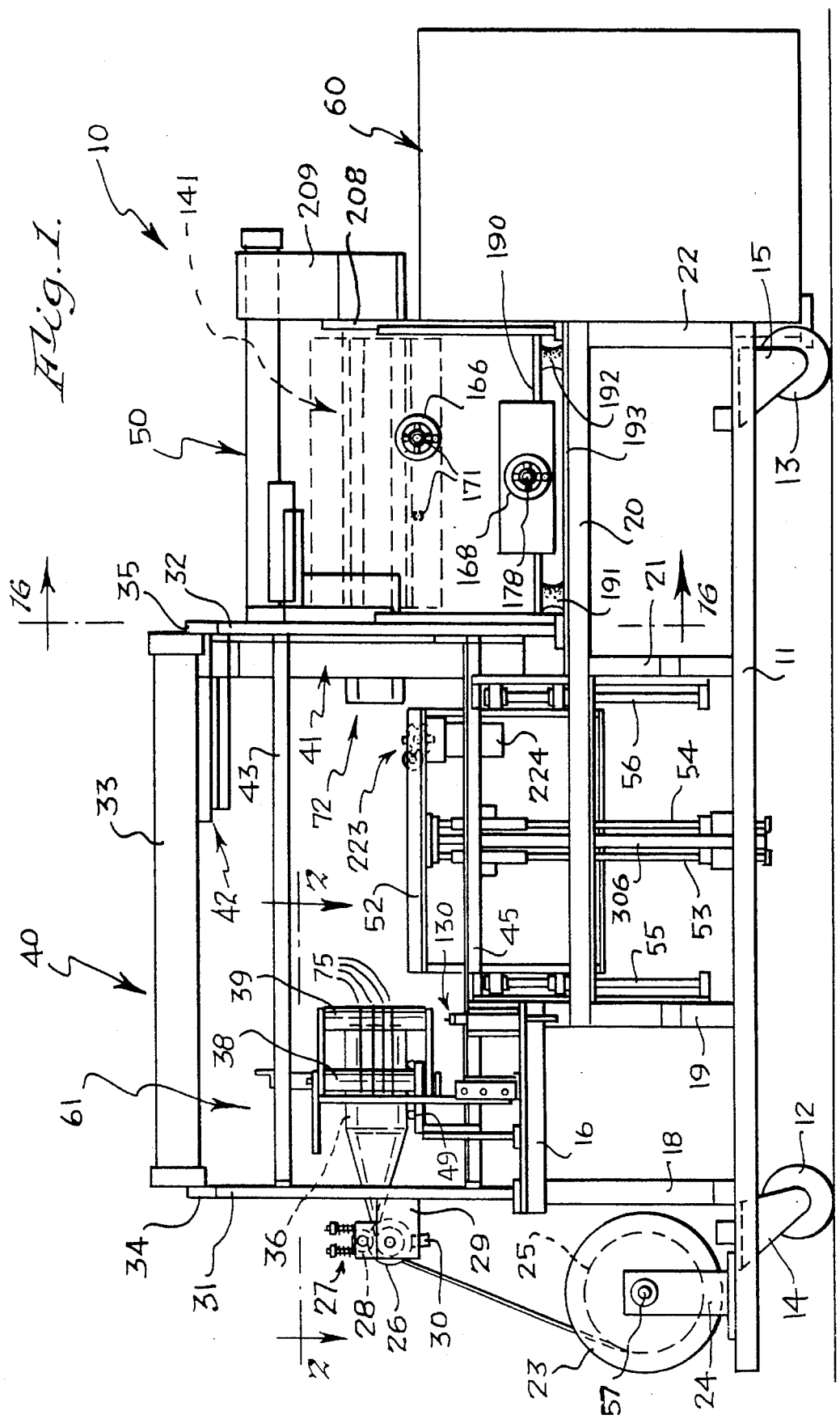

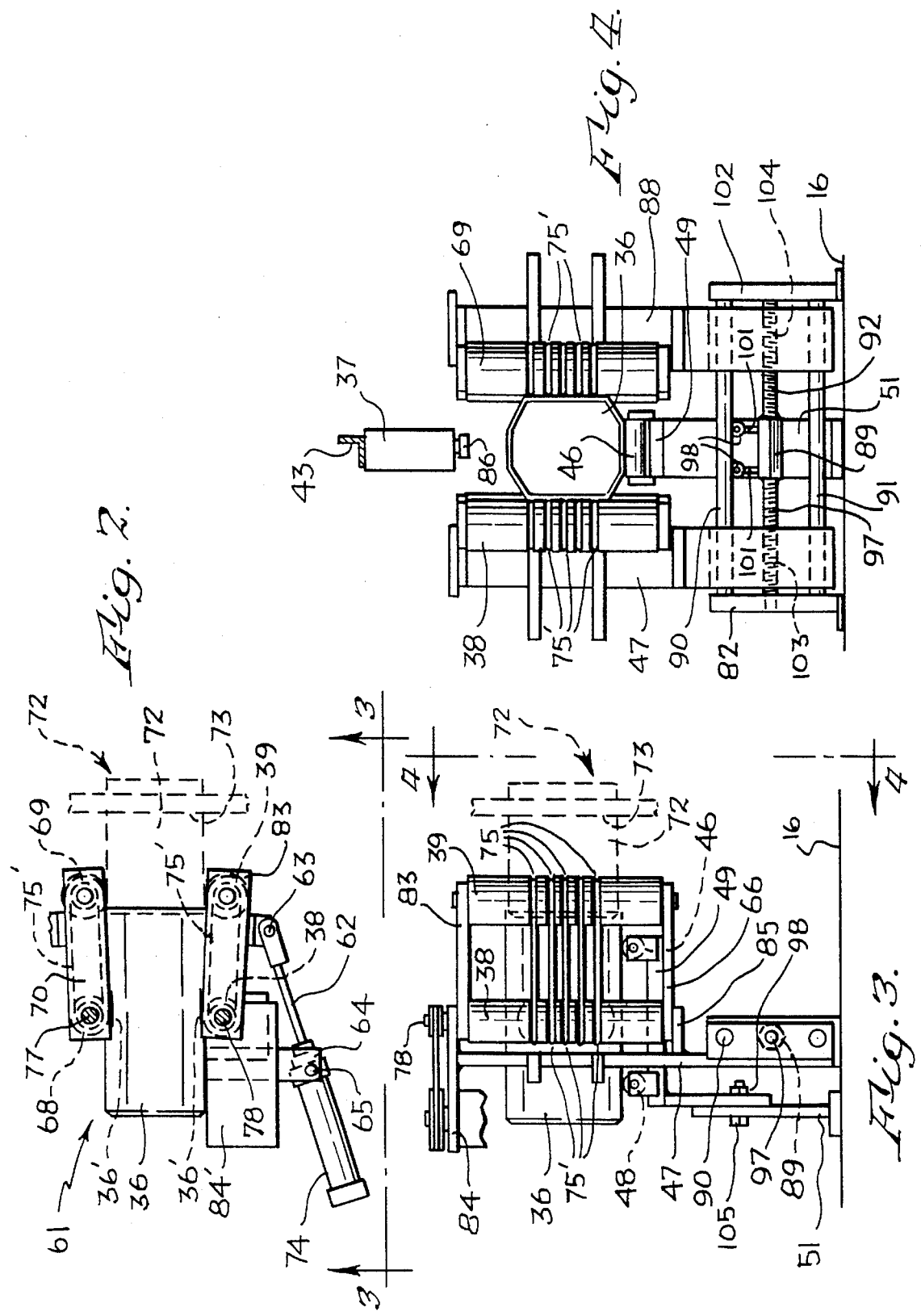

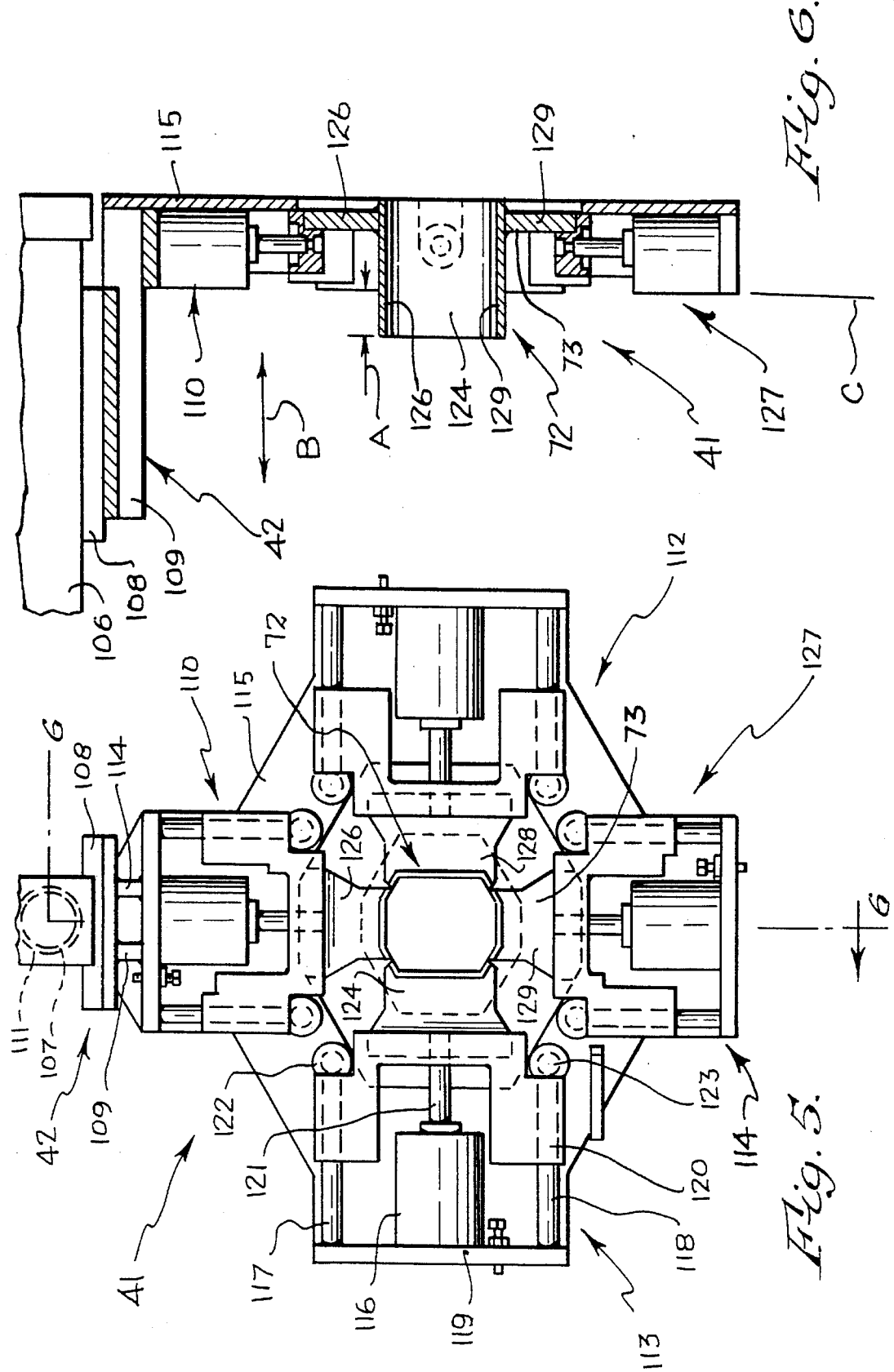

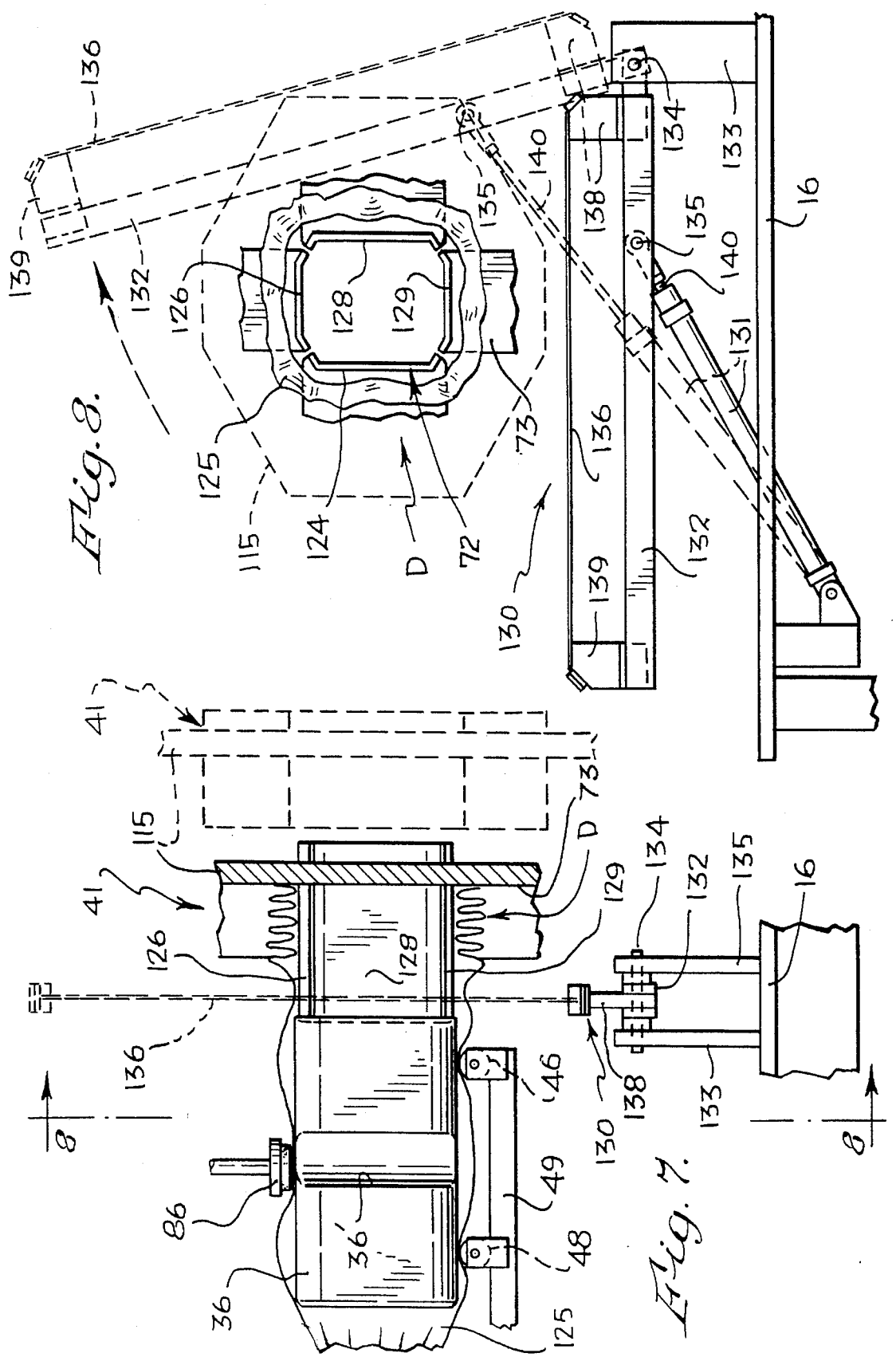

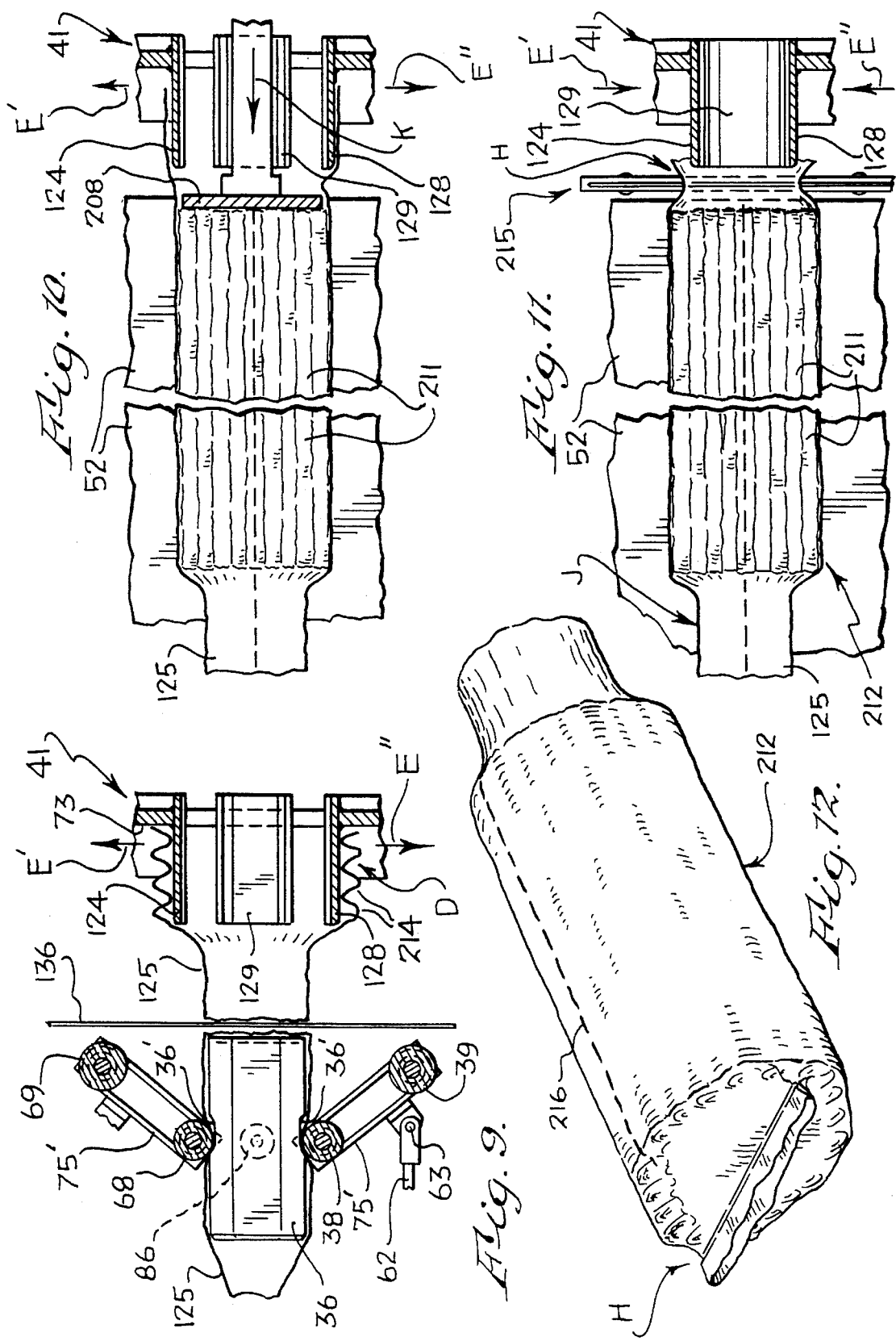

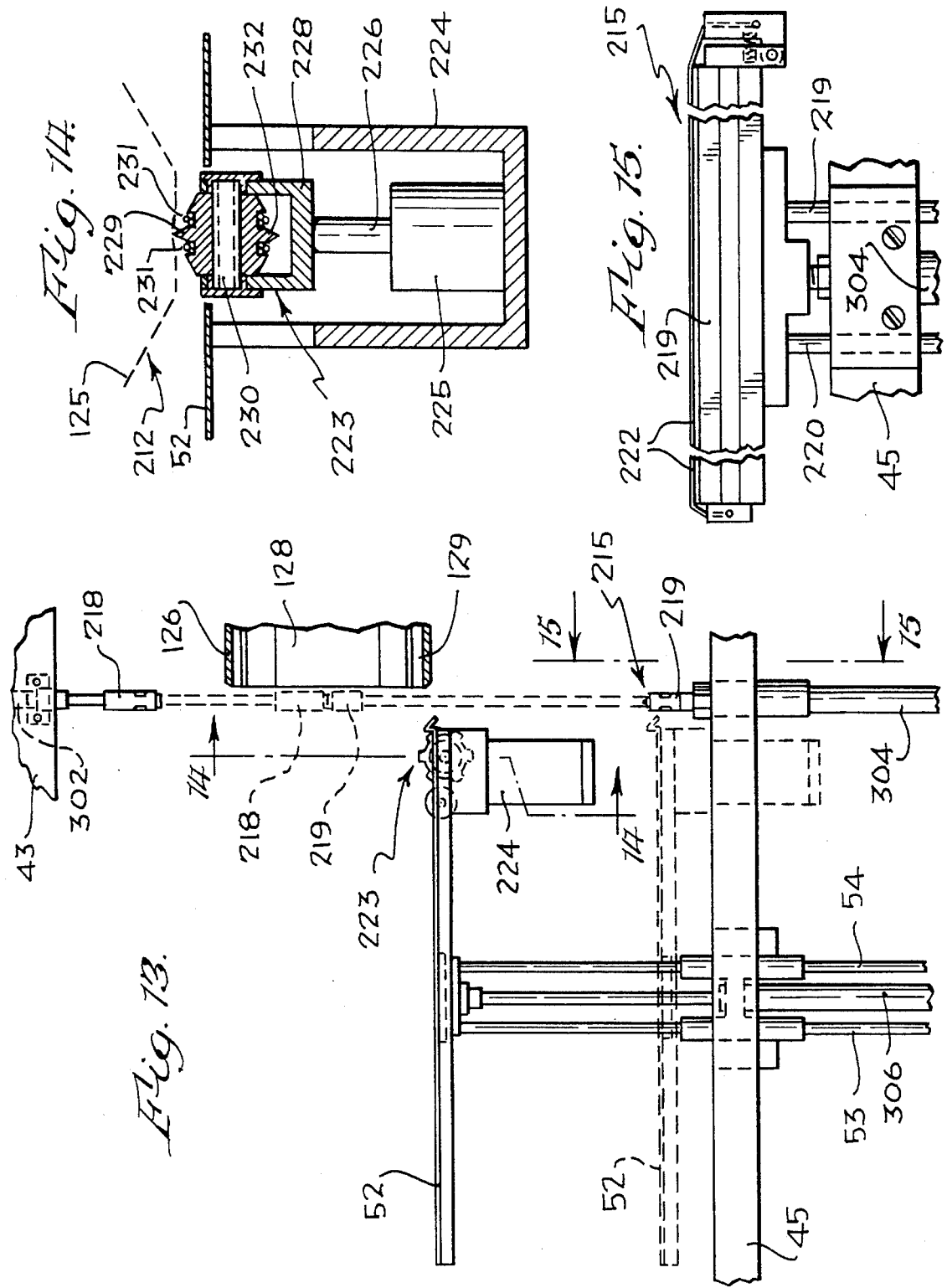

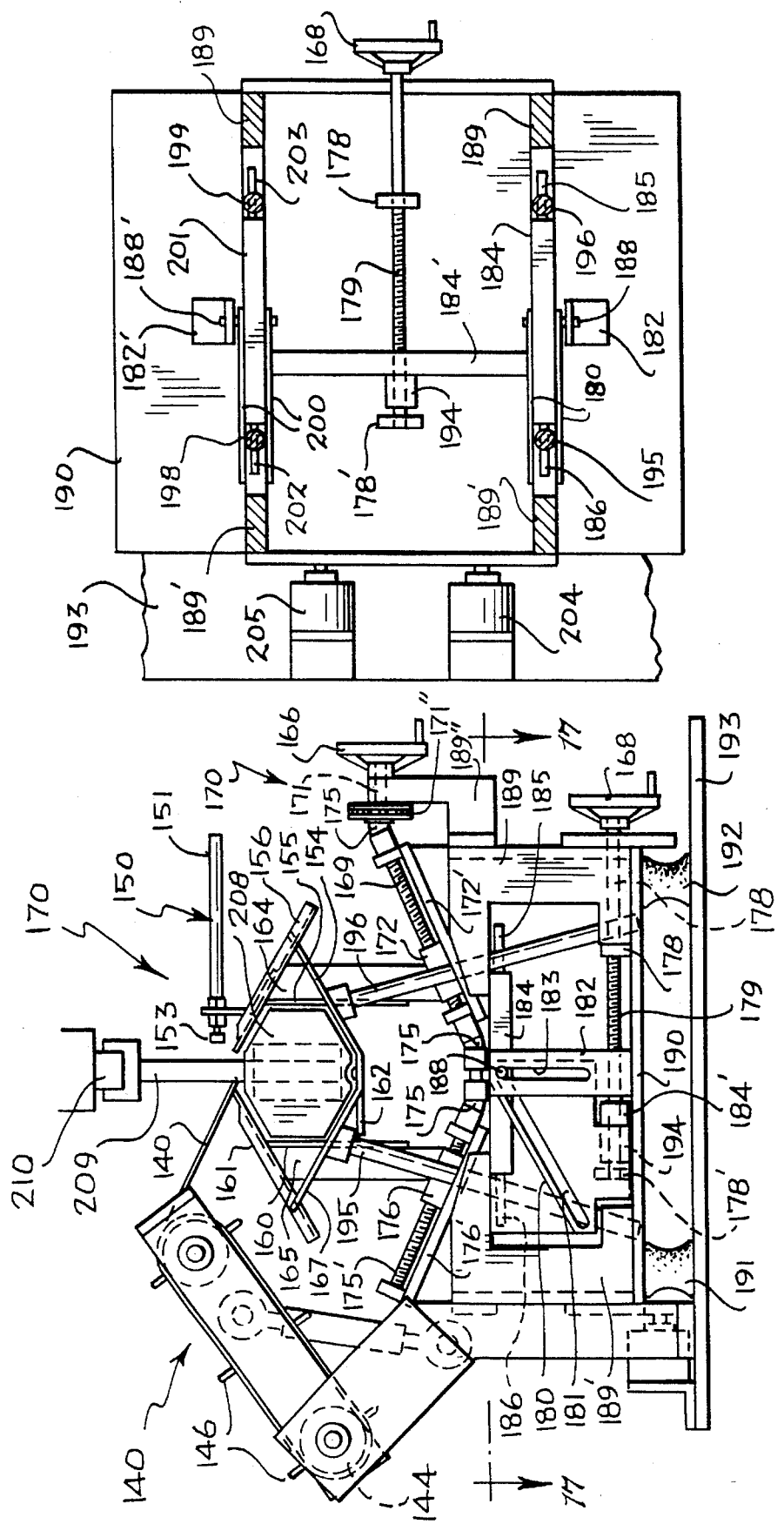

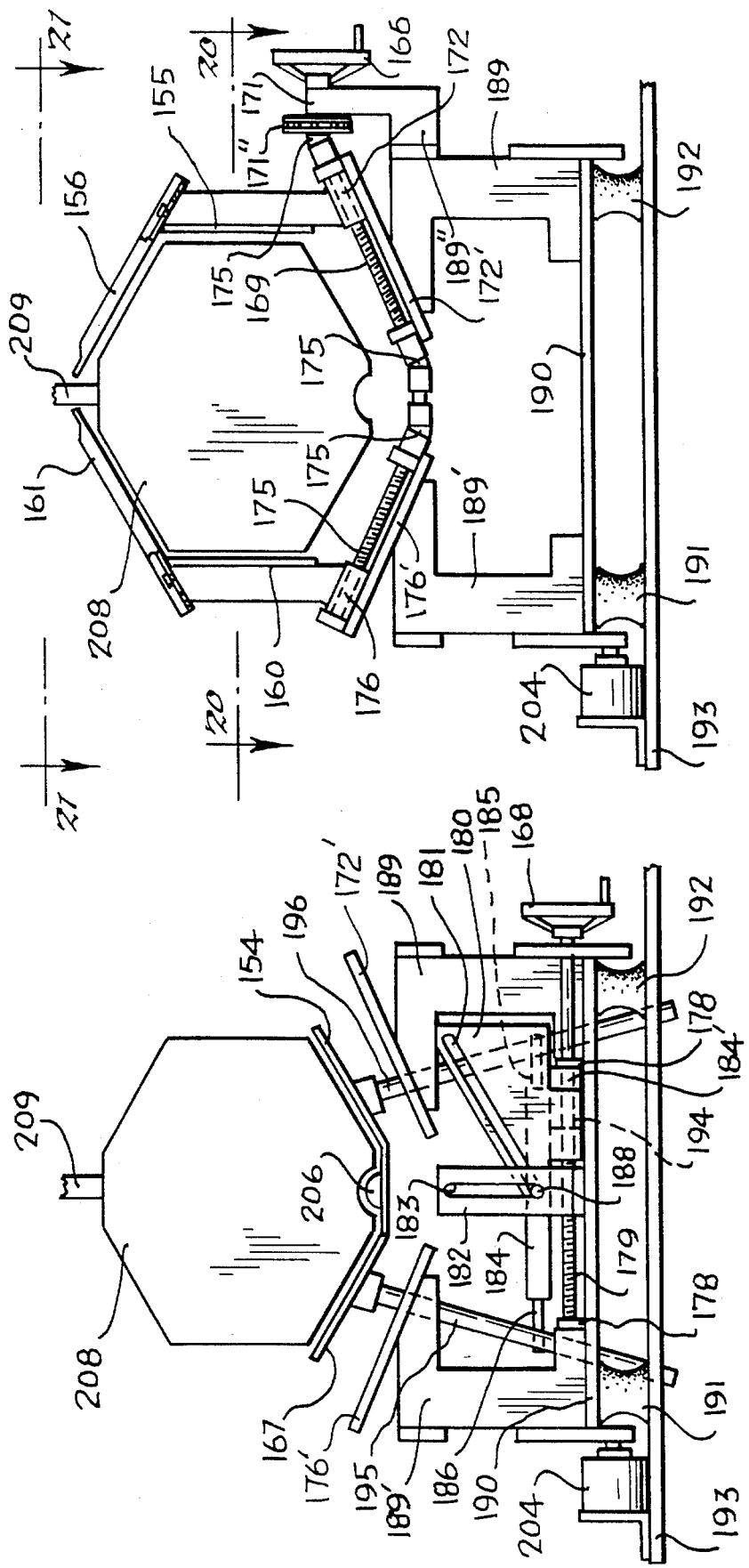

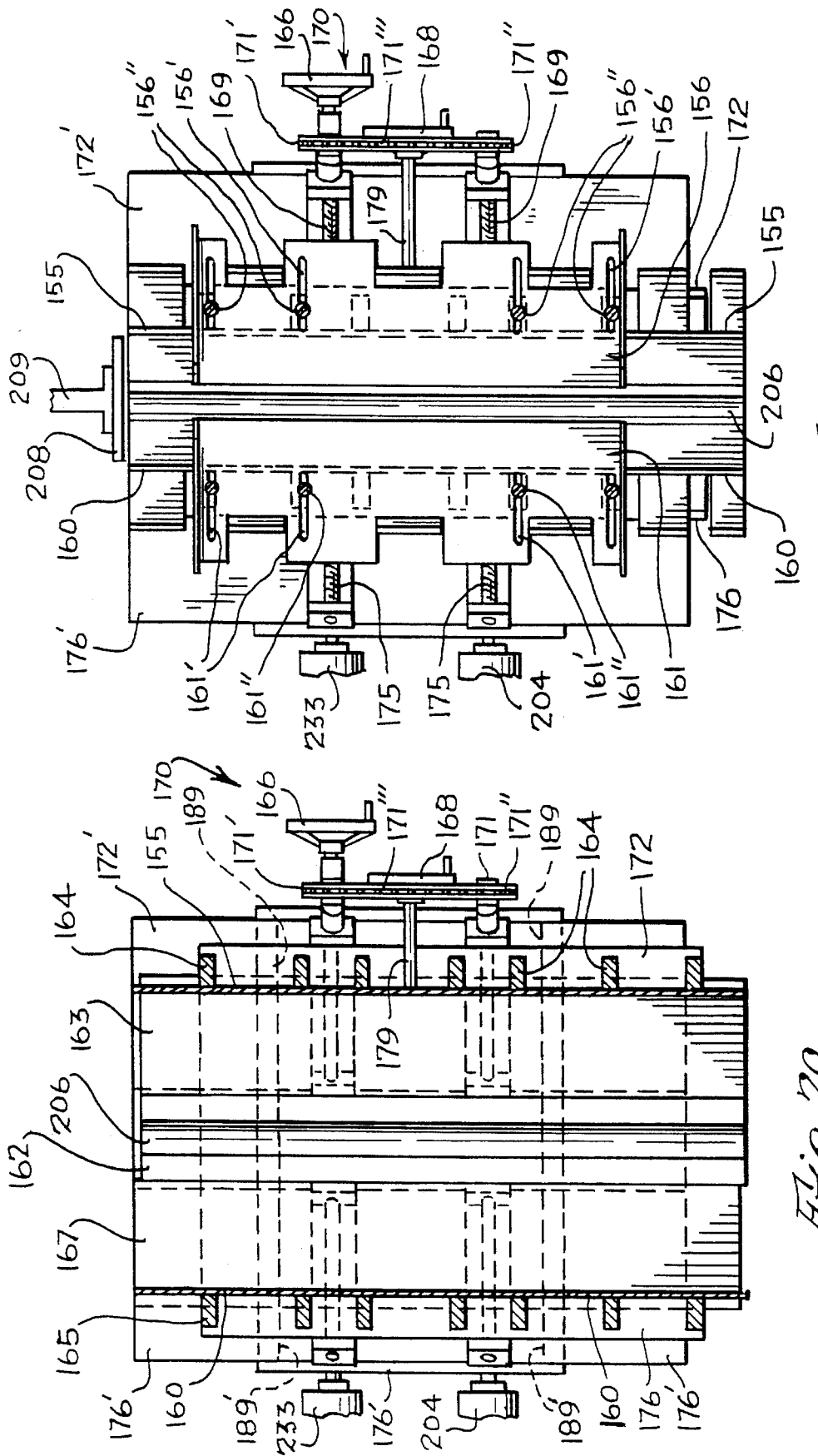

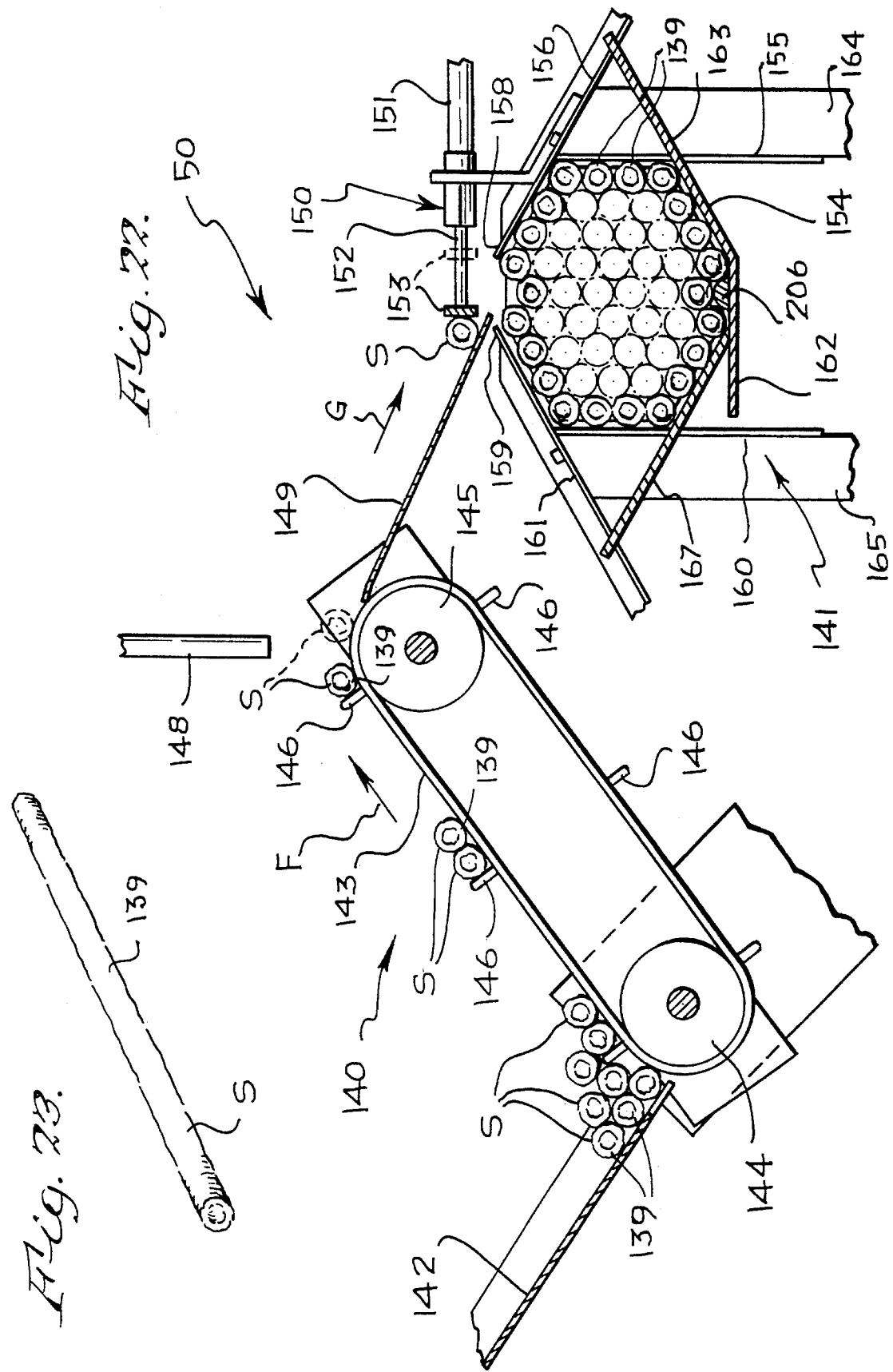

MACHINE FOR MAKING A PACKAGE OF FOOD CASING STRANDS

BACKGROUND OF THE INVENTION

This is a Continuation-in-Part of U.S. Ser. No. 07/966,961, filed Oct. 27, 1992 now U.S. Pat. No. 5,328,031, which in turn is a Continuation-in-Part of U.S. Ser. No. 07/907,007, filed Jul. 1, 1992, now U.S. Pat. No. 5,228,572, which in turn is a Continuation-in Part of U.S. Ser. No. 07/696,436, filed May 6, 1991, now U.S. Pat. No. 5,137,153.

This invention relates to packaging for shirred food casing strands, and, more particularly, to a machine for making a package of food casing strands where the package has a hexagonal-like cross section. Even more particularly, the machine is capable of making the packages described in detail in U.S. Pat. No. 5,137,153, incorporated herein by reference, and its Continuation-in-Part application Ser. No. 07/907,007, also incorporated herein by reference.

Food casings are used for packaging food products, especially meats such as sausages, but also for other food products, such as cheeses. When delivered to a meat packer, food casing strands are commonly in shirred form, i.e., folded in the form of a cylindrical strand, usually containing from 50 to 125 units of length of unshirred casing per unit length of shirred strand. When such casings are shirred, they are packaged for delivery to the meat packer, to protect the strand from contamination, accidental deshirring (unfolding), crushing, or strand breakage (i.e., breaking or deshirring of the strand between the ends of the strand such that the strand loses coherency and is no longer self supporting in folded form).

Several problems encountered in the prior art have been solved by the unique packages disclosed in the above-identified patent and patent application. The problem which remains to be solved, and is solved by the invention disclosed herein, is the inefficient, manual handling and transport of the shirred products from the shirring machine tray into the new package.

BRIEF SUMMARY OF THE INVENTION

The invention broadly comprises a machine for making a package of food casing strands, wherein the package has a hexagonal-like cross section. The machine comprises a product holder for initially holding a plurality of the strands in a configuration having a hexagonal-like cross section, wherein the holder has an outside perimeter having an opening therein for admitting the strands into the holder; means for transporting the strands to the holder and for depositing the strands into the opening; shaker means for shaking the holder at predetermined times to ensure that the plurality of strands settle into the holder in the configuration having a hexagonal-like cross section; means for measuring and cutting a predetermined amount of stretch film, where the stretch film is a closed loop used to encase the package of food casing strands; means for stretching and holding the stretch film into a shape of a polygon having a perimeter which is larger than the holder perimeter; means for moving the stretched film into a position proximate the holder; means for pushing all of the strands out of the holder and into the stretched closed loop of film; and, means for releasing the stretched film, wherein the film then relaxes about the plurality of strands to form the package of food casing strands.

The invention also comprises a method for making a package of food casing strands, wherein the package has a hexagonal-like cross section, comprising the steps of initially holding a plurality of the strands in a configuration having a hexagonal-like cross section, wherein the holder has an opening therein for admitting the strands into the holder; transporting the strands to the holder and for depositing the strands into the opening; shaking the holder at predetermined times to ensure that the plurality of strands settle into the holder in the configuration having a hexagonal-like cross section; measuring and cutting a predetermined amount of stretch film, where the stretch film is a closed loop used to encase the package of food casing strands; stretching and holding the stretch film into a shape of a polygon having a perimeter which is larger than the perimeter of the holder; moving the stretched film into a position proximate the holder; pushing all of the strands out of the holder and into the stretched closed loop of film; and, releasing the stretched film, wherein the film then relaxes about the plurality of strands to form the package of food casing strands.

BRIEF DESCRIPTION OF THE DRAWINGS

FIG. 1 is a simplified side elevation of the apparatus of the invention;

FIG. 2 is a fragmentary top plan view of the film feed mechanism taken generally along line 2—2 of FIG. 1;

FIG. 3 is a side elevation of FIG. 2 taken generally along line 3—3 of FIG. 2;

FIG. 4 is an end view of FIG. 3 taken generally along line 4—4 of FIG. 3;

FIG. 5 is a frontal face view of the tube expander and transport means;

FIG. 6 is a vertical cross-sectional view taken generally along line 6—6 of FIG. 5;

FIG. 7 is a vertical sectional view of the film tube as it is loaded onto the flying mandrel, also illustrating how the film is gathered and accumulated onto the tube expander during loading;

FIG. 8 is a cross-sectional view taken along line 8—8 of FIG. 7 with the tube cutting means in cutting position in dotted lines and in its down position in full lines;

FIG. 9 is a fragmentary planar sectional view showing the gathered tube transported to the right and cut by the tube cutter;

FIG. 10 is a similar view to FIG. 9 showing a continuation of the operation where the tube wrapping has been pushed to the left by the product pile, as the gathered tube is stripped off of the holding jaws of the transport mechanism;

FIG. 11 is a similar view continuing to show the tube wrapping sealed at its right end;

FIG. 12 is a perspective view of the finished shrunken package;

FIG. 13 is a side elevation of the finish-product table in an up position (in full lines) and down position (in dotted lines);

FIG. 14 is a vertical cross sectional view taken generally along line 14—14 of FIG. 13, showing the wrapper perforating means;

FIG. 15 is a vertical cross sectional view taken generally along line 15—15 of FIG. 13, showing the end sealing means in its down position;

FIG. 16 is a vertical cross sectional view of the product holder adjustment apparatus, taken generally along line 16—16 of FIG. 1;

FIG. 17 is a horizontal section taken along line 17—17 of FIG. 16;

FIG. 18 is a fragmentary section similar to FIG. 16 showing the lower support plates, and adjusting means adjusted to their largest opening;

FIG. 19 is a similar view to FIG. 18 showing the vertical plates and adjusting means adjusted to their largest position;

FIG. 20 is a horizontal section taken along line 20—20 of FIG. 19, again in the largest position;

FIG. 21 is a fragmentary plan view of the same area as FIG. 20 taken along line 21—21 of FIG. 19;

FIG. 22 is a vertical sectional view similar to FIG. 16 of the feed mechanism;

FIG. 23 is a perspective of a single casing stick.

DETAILED DESCRIPTION OF THE INVENTION

At the outset, it should be clearly understood that the drawings are to be read together with the specification, and are to be considered a portion of the entire "written description" of this invention, as required by 35 U.S.C. 112. Identical reference numerals on different figures refer to identical elements of the invention. The terms "top", "bottom", "left", "right", "front", "back", and derivatives thereof refer to the perspective of a viewer of FIG. 1.

FIG. 1 is a simplified side elevation of the apparatus 10 of the invention. The machine 10 broadly comprises film transport mechanism 40 and casing strand transport mechanism 50. A plurality of casing strands are fed into the machine and arranged into a predetermined shape by the casing transport mechanism. At the same time, stretch film is fed into the film transport mechanism where it is formed into a closed loop (to encase the plurality of strands) of a predetermined length. The stretch film is cut and then delivered from the left of the machine to the right of the machine, where the plurality of strands are then pushed into the open loop of stretched film. The expanded tube of film is then allowed to relax about the plurality of strands to form the package. The package is placed on a table in the center of the apparatus where it may be picked up by an operator or, alternatively, the table may be inclined in order that the package may slide off the table and onto a conveyor.

Machine 10 comprises frame 11 which is supported by four wheels. Left front wheel 12 supported by left front wheel support 14 and right front wheel 13 supported by right front wheel support 15 are shown in FIG. 1. The two back wheels are in line with the wheels shown and so cannot be seen. The frame comprises first vertical support 18, second vertical support 19, third vertical support 21, fourth vertical support 22, film feed mechanism support 16, first horizontal frame member 20, bottom horizontal support 45, intermediate horizontal support 43, top support 33, left front vertical leg 31 (and a corresponding back vertical leg behind), right front vertical leg 32 (and a corresponding back vertical leg behind), left horizontal cross frame member 34, and right horizontal cross frame member 35.

Film supply reel 23 is mounted to frame 11 by mounting bracket 24. The reel rotates about axle 57. The film roll 25 comprises a stretch film in tubular form.

Film feed mechanism support 16 is supported by first vertical support 18 and second vertical support 19. Film feed mechanism 61 is mounted to support 16 by support arm 49 (mounted to vertical support 51, shown in FIG. 3), and by front adjustable support 47 (mounted to mounting bracket 82 and bracket 102 as shown in FIG. 4). The feed film mechanism comprises two pairs of spring loaded rollers with each pair grooved to form a set of pulleys. The roller pairs are positioned on two sides of a flying mandrel 36. As shown in FIGS. 1, 2, 3 and 4, left front vertical film feed roller 38 and right front vertical film feed roller 39 are connected by a set of drive pulleys 75 and positioned in front of flying mandrel 36.

Flying mandrel 36 has an octagonal cross section (best shown in FIG. 4) and is lightweight; it may be constructed of plastic or similar lightweight material. The mandrel is supported by left flying mandrel support roller 48 and right flying mandrel support roller 46 (shown in FIG. 3). Each roller is, in turn, supported by support arm 49.

Upper and lower horizontal film feed rollers 28 and 26, respectively, are mounted to left front vertical leg 31 by feed roller mounting bracket 29. Spring loading mechanism 27 forces the rollers together to assist the film feed. Also located on mounting bracket 29 is proximity film length counter 30 which measures the amount of film being supplied.

As will be explained in detail infra, tube expander and transport means 41 is operatively arranged to slide across support 42 and align tube expander 72 with the mandrel to receive the film tube.

Work product table 52 is located between film feed mechanism 61 and tube expander and transport means 41. The work product table may be raised or lowered by a pneumatic cylinder 306 having alignment rods 53 and 54, and guide rods 55 and 56. The table is lowered when mechanism 41 slides leftwardly toward the flying mandrel and is raised after mechanism 41 returns to the position shown in FIG. 1.

FIG. 2 is a fragmentary top plan view of the film feed mechanism taken generally along line 2—2 of FIG. 1. The feed film mechanism 61 is shown after the tube expander 72 (shown in dotted lines in FIGS. 2 and 3 with its associated flange 73) has moved into place adjacent flying mandrel 36. Front film feed rollers 38 and 39 are shown mounted to front feed roller top mounting bracket 83, and back film feed rollers 68 and 69 are shown mounted on back feed roller top mounting bracket 70. Left rollers 38 and 68 ride in vertical grooves 36' in flying mandrel 36, shown in more detail in FIGS. 7 and 9. The grooves prevent the mandrel from moving to the left or right as the film tube is advanced.

As best shown in FIG. 3, which is a side elevation of FIG. 2, taken generally along line 3—3 of FIG. 2, roller 38 is mounted to top bracket 83 and bottom bracket 66 by an axle 78 which extends through support arm 84 and is rotatably mounted to support arm 85. Thus, it is seen that brackets 83 and 66 can pivot relative to support arms 84 and 85, about axle 78. Referring to FIG. 2, it is seen that pneumatic cylinder 74, secured to mounting bracket 64 by pin 65, includes a piston 62 which is secured to bracket 66 (shown in FIG. 3) at pin 63. The pneumatic cylinder can retract, causing roller 39 to pivot away from the flying mandrel about axle 78. The pneumatic cylinder is double-acting and can extend as well as retract. When it extends, it pushes roller 39, and its grooved pulleys and drive belts 75' in contact with the film located between the pulleys and the mandrel surface. A similar pneumatic cylinder (not shown) functions in the same way to move roller 69 to pivot away from the flying mandrel about axle 77 and also extends to move the belts of the pulleys of roller 69 into contact with the film.

FIG. 4 is an end view of FIG. 3 taken generally along line 4—4 of FIG. 3. As shown in FIG. 4, flying mandrel 36 has a generally octagonal cross-section. The bottom of the flying mandrel rests on rollers 46 and 48. Roller 46 can be seen in FIG. 4 whereas both rollers are seen in FIG. 3. The sides of the mandrel are in contact with rollers 39 and 69, which function to advance the film wrap over the mandrel. Also shown in FIG. 4 is film feed stop assembly 37 which is mounted to intermediate horizontal support 43. The stop assembly includes film feed 86 which is essentially a plunger which is operatively arranged to move downwardly to contact the film and stop it from advancing along the mandrel.

It is important to note that the apparatus is adjustable to accommodate different size packages. To make a larger package, for example, one would use a mandrel having a larger cross-sectional area than shown in FIG. 4. To accommodate mandrels of different sizes, front adjustable support 47 and rear adjustable support 88 are arranged to move both toward and away from the mandrel. Hexagonal part 89 is fixedly secured to right-hand screw rod 92 and left-hand screw rod 97, the opposite ends of which ride in bearings (not shown) in mounting bracket 82 and 102, respectively. Left-hand screw rod 97 is threaded into a through-bore 103 of front adjustable support 47, and right-hand screw 92 is threaded into a throughbore 104 of rear adjustable support 88. Support members 47 and 88 are further supported by guide rails 90 and 91, which pass freely through throughbores in the support members. The guide rails are rigidly secured to mounting brackets 82 and 102, and supports 47 and 88 can slide horizontally on the guide rails both toward and away from the mandrel. To move members 47 and 88 toward the mandrel, one would apply a wrench to hexagonal part 89 and turn the member in a counter-clockwise direction (from a perspective facing FIG. 3) whereas turning the part in a clockwise direction would cause the members to move away from the mandrel.

In addition to horizontal adjustment, the support arm for the flying mandrel rollers 49 can also be adjusted vertically to accommodate mandrels of different sizes. As seen in FIGS. 3 and 4, the support arm is secured to support arm mounting bracket 51 by a pair of bolts and nuts, which bolts pass through slots 101 in the support arm 49. Bolt 105 and its nut 98 are shown in FIG. 3, whereas both nuts 98 are shown in FIG. 4. Obviously, nuts 98 can be loosened to adjust the height of support arm 49, which, in turn, determines the vertical position of the mandrel.

Adverting now to FIG. 5, a frontal face view of tube expander and transport means 41 is depicted. The operation of the tube expander and transport means will be discussed in detail infra, but, in general, this part of the apparatus functions to expand the tube of film in order that the tube may be filled with casing strands, and also functions to transport the expanded tube from the "film feed" side of the apparatus to the "casing feed" side of the apparatus.

The tube expander and transport means is operatively arranged to move both toward and away from the flying mandrel via slide 42. Slide 42 comprises rectangular cylinder 106 (shown in FIG. 6) which is fixedly secured to the tube expander and transport means. The cylinder contains partial through-bore 111, the surface of which surrounds round guide rail 107. The tube expander and transport means slidingly engages the guide rail as it moves to and fro. The through-bore is capped on both ends to limit travel of the tube expander and transport means.

The tube expander and transport means is secured to bracket 106 by angle bracket 108 and longitudinal support members 109 and 114. Means 41 broadly comprises four expander modules, including top expander 110, right expander 112, bottom expander 114 and left expander 113.

The expander modules are arranged at right angles relative to adjacent modules. The modules are all mounted to expander module octagonal bracket 115.

The four expander modules operate together to expand the film tube to enable the casing strands to be placed therein. The four expander modules are virtually identical in structure, and are identical in operation. In structure, the top and bottom expanders are more restricted in travel, and hence use shorter pistons. Since the expander modules are virtually identical, only module 113 will be described in detail.

Expander module 113 generally comprises cylinder 116 and slide rods 117 and 118, all of which are rigidly secured to left vertical plate 119 which is an integral part of octagonal bracket 115. Slide 120 is slidingly mounted to slide rods 117 and 118 and rigidly secured to piston 121 of expansion cylinder 116. Slide rods 117 and 118 are secured to bracket 115 at support rods 122 and 123, respectively. Mounted to slide 120 is horizontal expansion finger 124 (modules 112 and 113 have horizontal expansion fingers 124 and 128 whereas modules 110 and 114 have vertical expansion fingers 126 and 129.) Expansion cylinder 116 functions to move the expansion finger 124 in a horizontal direction. Referring to FIG. 5, moving the finger leftwardly would tend to expand the film tube. As can be seen in FIG. 5, the two vertical and two horizontal expansion fingers function together to expand the film tube when the respective pistons of the four expansion cylinders are retracted.

FIG. 6 is a vertical cross-sectional view taken generally along line 6—6 of FIG. 5. As shown in FIG. 6, tube expander and transport means 41 is operatively arranged to travel both toward and away from the flying mandrel in a direction indicated by double-headed arrow B. With reference to FIG. 6, the transport means would travel leftwardly toward the mandrel to obtain the film tube and then would return rightwardly with the film tube attached to the expansion fingers. As shown in FIG. 6, back expansion finger 124 extends leftwardly a distance A past the plane C coincident with the farthest left surface of the expansion cylinders. This enables the expansion fingers to engage the film tube without interference.

FIG. 7 is a vertical sectional view of the film tube as it is loaded onto the flying mandrel, and also illustrates how the film is gathered and accumulated onto the tube expander during loading. As shown in the drawing, tube expander and transport means 41 has been positioned such that its expansion fingers (126, 129, etc.) are located just inside the bore of the hollow flying mandrel. This enables the film tube 125 to pass over the outer surface of mandrel 36 and to be gathered onto the expansion fingers. The gathered tubing is indicated by the letter D on FIG. 7. The tubing is advanced on the mandrel by the action of front rollers 38 and 39 and their belts 75' (shown in FIGS. 1, 2 and 3), and by corresponding rear rollers 68 and 69 with their belts 75'. Rollers 48 and 46 are free-wheeling and spin freely as the tube is advanced. Since the mandrel is very light in weight (it is made of lightweight plastic), there is very little friction between the mandrel, the tubing and the support rollers 46 and 48. The mandrel essentially floats atop the tubing and rollers. The tubing is driven, then, only by side belts 75' of rollers 38, 39, 68 and 69. The mandrel is prevented from traveling rightward by the expansion fingers which have locked inside vertical grooves in the hollow mandrel. Of course, advancement of the tubing occurs when stop 86 is in the "up" position and not while in the "down" position as shown in FIG. 7. As the tubing advances on the mandrel, it eventually contacts the surface 73 and then gathers on the surface of the expansion fingers. When a predetermined amount of tubing has been advanced, stop 86 is activated to stop the advance and, simultaneously, the motors which drive the feed rollers (not shown) are deenergized to stop the further advance.

After a predetermined amount of tubing has been gathered, the tube expander is moved away from the mandrel, as shown in FIG. 9. Simultaneously, the expansion fingers expand the stretch tubing, also as shown in FIG. 9. The tubing is then cut between the expansion fingers and the mandrel.

The tube cutting apparatus 130 is illustrated in FIGS. 7, 8 and 9. In general, the apparatus comprises a hot wire 136 mounted to hot wire support arm 132 by support brackets 138 and 139. Support arm 132 is pivotally mounted to left tube cutter mounting bracket 133 and right tube cutter mounting bracket 135 by tube cutter pivot arm 134. As shown in FIG. 8, piston rod 140 of pneumatic cylinder 131 is secured to support arm 132 by bolt 135. As shown in dotted lines in FIG. 8, when the pneumatic cylinder is actuated, hot wire 136 rotates upwardly (in a clockwise direction with reference to FIG. 8) to cut tubing 125.

FIG. 9 illustrates in looking from the top that the tubing is cut after the tube expander and transport means 41 has disengaged from the flying mandrel and traveled rightwardly away therefrom, and after the expansion fingers have expanded the stretch film tubing 125 (expansion fingers 124 and 128 are shown as expanding outwardly in direction E' and E", respectively, in FIG. 9.) With stop 86 in its "down" position locking the tubing in place on the mandrel, and with the expansion fingers in their expanded position (radially outward with respect to the mandrel), it should be understood that the tubing becomes somewhat taut between the mandrel and the expansion fingers as the tube expander and transport means moves away from the mandrel. It is at this time, when the tubing is taut, that hot wire 136 is energized and actuated to cut the tubing. It should also be noted in FIG. 9 that the grooves for the belts 75' are deeper on rollers 39 and 69 than on rollers 38 and 68, respectively.

Thus far, the film transport mechanism of the apparatus has been described, which functions essentially to transport a predetermined length of a closed loop of stretch film from the left of the machine to the right of the machine where the tubing loop is filled with casing strands. The casing strands are fed into the machine by the casing strand transport mechanism 50, which will now be described in more detail.

As shown in FIG. 1, casing strand transport mechanism 50 is located on the right-hand side of the machine. The mechanism includes a means for feeding a plurality of casing strands into the machine and arranging them into a predetermined shape. The strands are then pushed into the tubing loop to form the finished package.

Adverting now to FIG. 23, a single casing stick 139 is illustrated in perspective, a plurality of which are formed into the package of the invention.

FIG. 22 broadly illustrates casing strand transport mechanism 50, which comprises conveyor 140 and product holder 141. The conveyor functions to transport the casing strands to the product holder. The conveyor comprises first inclined ramp 142, upon which a plurality S of casing strands are placed. Gravity causes the strands to roll to the bottom of the ramp.

The conveyor also comprises conveyor belt 143 which surrounds roller 144 and drive roller 145. The belt includes a plurality of lugs 146 protruding outwardly therefrom. As shown in FIG. 22, the lugs "catch" one, two or more of the strands as the belt travels in direction F and forces the strands toward the top of the conveyor. Sensor 148 is located atop the conveyor at its apex and functions to sense the presence of casing strands on the conveyor belt. When a strand is sensed, appropriate control signals are sent to control the conveyor such that only one strand at a time is allowed to fall down inclined ramp 149 in direction G.

At the bottom of ramp 149 is stop 150 which comprises two pneumatic cylinders whose pistons extend to prevent casing strands from entering the product holder. (Only one cylinder 151 is shown in FIG. 22, which cylinder has a piston 152 and a flat member 153 mounted to the distal end thereof which contacts and stops the casing strand. A second cylinder is not shown but is located "behind" the first, such that each piston would be in contact with separate ends of an individual casing.) As the casing strands roll down ramp 149, it is possible for the strands to become misaligned with respect to the opening of the product holder. Also, the momentum of the rolling strands would tend to cause the strands to overshoot the opening, or to cause other filling problems. Stop 150 functions to align the strand with the opening, and then allows the strand to gently drop into the opening when the piston of the cylinder is retracted.

Product holder 141 broadly comprises first angled plate 154 which has a base section 162 disposed horizontally and an angled section 163 extending rightwardly upward from the base section at a fixed angle from the horizontal; (in a preferred embodiment, the fixed angle is 30 degrees); a first vertical plate 155 vertically disposed and forming the right side limitation of the product holder 141, is mounted on the inside of seven upright supports 164 (see FIG. 20) which are integral with a bottom slide bar 172, slidable on a slide plate 172' disposed at an angle and mounted on right "C" shaped frame member 189 at the right side as seen in FIG. 16. The top of each of the seven upright supports 164 mount on first upper limitation member 156, which can be adjusted toward and away from the apex of the product holder 141. The angled section 163 is mounted at the top of adjustment shafts 196 and 199 as seen in FIG. 17, and explained in more detail infra.

The above comprises the right side, looking at FIGS. 16 and 22, of the product holder 141.

The left side as seen in FIGS. 16 and 22 will now be described. A first flat plate 167 also mounted at the top end of angularly inclined shafts 195 and 198, as seen in FIG. 17 will be explained infra. A second vertical plate 160 opposed to the first mentioned vertical plate 155 is also mounted on the inside of another seven upright supports 165 which are integral with a bottom slide bar 176, slidable on a slide plate 176' disposed at an angle and mounted on "C" shaped frame members 189' at the left side in FIG. 16. A second upper limitation member 161 is also used on this left side and, like its companion first upper limitation member 156, can be adjusted toward or away from the apex of the bundle. As can be seen in FIG. 21, the upper member 156 has four slots 156' and screws 156" to adjustably position the member 156. Also, the upper member 161 has four slots 161' and screws 161" to adjustably position the member 161. Thus, it is seen that the sides of the product holder are arranged to hold and form a package which is essentially hexagonal in shape. As will be described in detail infra, the sides of the product holder are adjustable to accommodate different size packages.

Also shown in FIG. 22 is half-casing dummy 206 which is secured to base section 162 at the bottom center of the product holder. The dummy functions to align the casing strands within the holder and also causes a space or void to exist in the bottom center of the package which is important for reasons which will be explained infra. The dummy position is adjustable and is manually positioned in the center of the holder whenever the size of the product holder is changed.

Product holder adjustment apparatus 170 is illustrated in FIG. 16 in vertical cross section, taken generally along line 16—16 of FIG. 1. The adjustment apparatus functions to adjust the size of the product holder to accommodate packages of different sizes. In general, first adjustment wheel 166 controls the width of the product holder and the height of the top walls of the holder (i.e., member 161 of plate 160 and member 156 of plate 155) while second adjustment wheel 168 controls the depth of the holder by controlling the position of plates 154 and 162. Specifically, turning wheel 166 in a clockwise direction increases the width and height of the package while turning wheel 168 in a clockwise direction increases the height of the package.

Both adjustment wheels 166 and 168 are mounted to housing 189 which, in turn is mounted to table 190. Table 190 is secured to table 193 by rubber feet, two of which (191 and 192) are shown in FIG. 16.

First adjustment wheel 166 turns shaft 171 having a sprocket 171' and chain drive 171''' connected with a sprocket 171'' on a second adjustment shaft 171 identical to the first. Since both shafts 171 are connected by the sprockets 171' and 171'' and their connecting chain drive 171''' they turn in unison either clockwise or counterclockwise.

The shafts 171 drive threaded shafts 169 through universal joints 175 which have another set of universal joints 175 on a short shaft mounting a third universal joint 175 on the end of a second threaded shaft 175' to the right as seen in FIG. 16.

The position of the bottom sections 163 and 154 of the product holder is adjusted by four shafts which are rigidly secured to the plates. The four adjustment shafts 195, 196, 198 and 199 are shown in FIG. 17. For simplicity, only operation of the front shafts 195 and 196 will be described, but it is to be understood that the rear shafts 198 and 199 function identically.

Referring to FIGS. 16 and 17, second adjustment wheel 168 turns shaft 179 which is rotatably mounted in bearings 178 and 178' upstanding from plate 190. A nut 194 can be driven to the left or right by turning the wheel 168 and its threaded shaft 179. The nut 194 is integrally mounted on a cross bar 184' which, at each of its ends, is fastened to the triangular members 180 at one end and 200 at the other, thus causing these to move either left or right as desired. Movement to the right in FIG. 16 will result in a larger (i.e., wider) product holder 141, while to the left will result in a smaller (i.e., narrower) product holder 141 as will be explained more fully infra. Triangular member 180 has an inclined slot 181 which runs along the hypotenuse of the triangular member. Front riser member 184 comprises three pintels 185, 186 and 188 extending therefrom. Pintel 188 extends into slot 181 of member 180 and also extends into slot 183 of vertical support 182, which vertical support is rigidly secured to table 190. Pintels 186 and 185 extend through slots in lower left adjustment shaft 195 and lower right adjustment shaft 196, respectively.

With reference to FIG. 16, as wheel 168 is turned in a counterclockwise direction, triangular member 180 moves leftwardly. Pintel 188, which is confined by both vertical slot 183 and inclined slot 181, is urged upwardly in vertical slot 183 as it moves rightwardly upward in slot 181. As the pintel moves upward, riser member 184 also moves upward, and its pintels 185 and 186, which ride in holes in shafts 196 and 195, respectively, cause the shafts to rise also, thereby causing plates 167 and 154 to rise and move inward to form a smaller size for the product holder. Turning wheel 168 in a clockwise direction causes member 180 to move rightwardly, causing member 184 to drop, in turn causing the shafts to drop, thereby increasing the size of the product holder as illustrated in FIG. 18.

FIG. 17 is a horizontal section taken along line 17—17 of FIG. 16, and illustrates rear triangular member 200, rear riser member 201 and its pintels 202 and 203, rear adjustment shafts 198 and 199, vertical support 182', and pintel 188'.

Also shown in FIG. 17 are shaker motors 204 and 205 which function to vibrate and shake table 190 which is suspended by rubber feet. The shaking assures that the casing strands settle in the product holder.

As stated previously, FIG. 16 illustrates the product holder adjusted to its smallest possible size. FIG. 18, on the contrary, is a fragmentary section similar to FIG. 16 showing the lower support plates, and adjusting means of the product holder adjusted to the largest size. Note that triangular member 180 is positioned to the extreme right and pintel 188 is at the bottom of slots 181 and 183.

FIG. 19 is a similar view to FIG. 18 showing the vertical plates and adjusting means in the largest position. Note that plate 160 is at the extreme left position and plate 155 is at the extreme right position. Note also that second upper limitation member 161 has been moved rightwardly upward with respect to plate 160, and first upper limitation member 156 has been moved leftwardly upward with respect to plate 155, forming a true hexagonal shape.

Once the product holder is full, it is necessary to push the plurality of strands into the tubing loop. This is accomplished by push-plate 208 which is shown in FIGS. 16, 18 and 19. As shown in FIGS. 18 and 19, the push-plate is generally hexagonal in shape, with a notch in the bottom thereof to accommodate the half-casing dummy. Different size push-plates are used for different size packages. For example, the largest size push-plate is shown in FIGS. 18 and 19, whereas the smallest size push-plate is shown in FIG. 16. As shown in FIG. 16, the push-plate is essentially a flat plate suspended by member 209 from guide rail 210. The plate is operatively arranged to move back and forth along the guide rail, and traverses the entire length of the product holder in order that it can push all of the strands out of the holder.

FIG. 20 is a horizontal section taken along line 20—20 of FIG. 19. Note a second shaker motor 233 is shown in FIG. 20.

FIG. 21 is a similar horizontal section to FIG. 20 taken along line 21—21 of FIG. 19.

FIG. 10 illustrates push-plate 208 pushing plurality of casing strands 211 in a direction designated by arrow K into tube film 125. As seen in transition between FIGS. 9 and 10, the plurality of strands forces excess tubing 214 to leave the outer surface of the expansion fingers as the strands are pushed into the tubing. The stretch tubing thus encases the entire plurality of strands with some excess tubing on each end. As shown in FIG. 11, tubing package 212 includes end J which is left open and end H which is sealed by hot wire sealing mechanism 215.

The finished package, illustrated in FIG. 12, is sealed on one end (end H) and perforated longitudinally (at 216) by apparatus illustrated in FIGS. 13–15. As shown in FIG. 13, sealing apparatus 215 comprises top lateral member 218 and bottom lateral member 219. Both members are supported by upper and lower pneumatic cylinders 302 and 304, respectively, and are operatively arranged to move toward one another as shown by the dotted lines in FIG. 13. Bottom member 219 comprises a wire which, when heated, causes the tubing to melt. As the hot wire comes into contact with the tubing, and the tubing is relaxed by the two lateral members, the end of the tubing is sealed. It should be noted that both ends of the tubing may be sealed by apparatus 215. A first end of the tubing may be sealed before strands are introduced into the tube and then the second end may be sealed after the strands are in place.

FIG. 15 shows the lower lateral member 219 in more detail, illustrating supporting pneumatic cylinders 304 and guide rods 219 and 220 and hot wire 222.

FIG. 13 also illustrates perforator 223 which is mounted to work product receiving table 52. The perforator makes a perforation in the bottom of the finished tubing package 216 in order that the package may be easily opened. The tubing film itself is very strong, and therefore difficult to tear by hand. Rather than requiring the ultimate customer to have to use a sharp instrument to open the package, the present invention makes a perforation in the package to facilitate opening without the use of a tool. It should be appreciated that the perforation is made in the bottom center of the package, precisely where half-casing dummy 206 was located when the package was formed. Hence, there is no casing strand directly above where the perforation is made, thereby reducing the risk of product damage by the perforation operation.

FIG. 13 also illustrates that table 52 may be moved to its full line position by a controlled piston and cylinder 306 from its downmost position as shown in dotted lines.

FIG. 14 illustrates the perforator in more detail. The perforator assembly 223 is supported by mounting bracket 224 which is secured to work product table 52. A pneumatic cylinder 225 is mounted to the bracket and the piston 226 of the cylinder supports the perforator housing 228. The perforator wheel 229 rotates freely about its bearing 230. The wheel itself is not independently driven; it merely rotates as the product passes over it. The actual perforation operation is accomplished by heating the perforator wheel, usually through a heating element in its bearing. As the heated wheel rotates the perforating points of the wheel (e.g., 232) melt perforations into the finished package. Silicon or other non-stick 0-rings 231 function to keep the melted material from adhering to the perforating wheel.

To facilitate understanding of the invention, the following Parts List is provided:

PARTS LIST

FIG. 1
10 apparatus
11 frame
12 left front wheel
13 right front wheel
14 left front wheel support
15 right front wheel support
16 film feed mechanism support
18 first front vertical support
19 second front vertical support
20 first horizontal frame member
21 third front vertical support
22 fourth front vertical support
23 film supply reel
24 film supply reel bracket
25 film roll
26 lower horizontal film feed roller
27 spring loading mechanism
28 upper horizontal film feed roller
29 feed roller mounting bracket
30 proximity film length counter
31 left front vertical leg
32 right front vertical leg
33 front top support
34 left horizontal cross frame support
35 right horizontal cross frame support
36 flying mandrel
38 left front vertical film feed roller
39 right front vertical film feed roller
40 film transport mechanism
41 tube expander and transport means
42 tube expander and transport means slide
43 intermediate horizontal support
45 bottom horizontal support
49 support arm for flying mandrel rollers
50 casing strand transport mechanism
52 work product receiving table
53 left receiving table alignment rod
54 right receiving table alignment rod
55 left front receiving table guide rod
56 right front receiving table guide rod
60 program controller
61 film feed mechanism
72 tube expander
75 drive pulleys
130 tube cutting apparatus
141 product holder
166 first adjustment wheel
168 second adjustment wheel
171 shaft
178 bearing
190 plate
191 rubber foot
192 rubber foot
193 table
208 push-plate
209 member
223 perforator
224 mounting bracket
306 pneumatic cylinder FIG. 2
36 flying mandrel
36' vertical grooves on mandrel which left rollers fit into
38 left front vertical film feed roller
39 right front vertical film feed roller
61 film feed mechanism
62 front feed roller pneumatic cylinder piston
63 first pivot pin
64 front feed roller pneumatic cylinder mounting bracket
65 second pivot pin
68 left back vertical film feed roller
69 right back vertical film feed roller
70 back feed roller bottom mounting bracket
72 tube expander
73 tube expander surface
74 front feed roller pneumatic cylinder
75' drive belt
77 axle
78 axle
83 bracket
84 support arm FIG. 3
16 film feed mechanism support
36 flying mandrel
38 left front vertical film feed roller
39 right front vertical film feed roller
46 right roller for flying mandrel
47 adjustable support for film feed rollers
48 left roller for flying mandrel
49 support arm for flying mandrel rollers
51 support arm mounting bracket
66 front feed roller bottom mounting bracket
72 tube expander
73 tube expander surface
75 vertical front feed roller pulleys
75' drive belt
78 left front feed roller mounting axle
83 front feed roller top mounting bracket
84 support arm for front feed roller drive motor
85 support arm for left front vertical film feed roller
89 hexagonal part
90 guide rail
97 left-hand screw rod
98 nut
105 front mounting bolt for adjustable support for film feed rollers
FIG. 4
16 film feed mechanism support
36 flying mandrel
37 film feed stop assembly
38 left front vertical film feed roller
39 right front vertical film feed roller
43 top horizontal support
46 right roller for flying mandrel
47 adjustable support for film feed rollers
49 support arm for flying mandrel rollers
51 support arm mounting bracket
69 right back vertical film feed roller
75' drive belt
82 mounting bracket
86 film feed stop
88 rear adjustable support
89 hexagonal part
90 guide rail
91 guide rail
92 right-hand screw rod
97 left-hand screw rod
98 nut
101 slot
102 mounting bracket
103 threaded through-bore
104 threaded through-bore
FIG. 5
41 tube expander and transport means
42 tube expander and transport means slide
72 tube expander
73 tube expander surface
107 round guide rail
108 angle bracket
109 longitudinal support member
110 top expander module
111 partial through-bore
112 right expander module
113 left expander module
114 longitudinal support member
115 octagonal bracket
116 piston
117 slide rods
118 slide rods
119 left vertical plate
120 slide
121 piston
122 support rods
123 support rods
124 back expansion finger
126 top expansion finger
127 bottom expander module
128 front expansion finger
129 bottom expansion finger
FIG. 6
41 tube expander and transport means
42 tube expander and transport means slide
72 tube expander
73 tube expander surface
106 bracket
108 angle bracket
109 longitudinal support member
110 top expander module
115 octagonal bracket
124 back expansion finger
126 top expansion finger
127 bottom expander module
129 bottom expansion finger
C plane coincident with farthest left surface of expansion cylinders
FIG. 7
16 film feed mechanism support
36 flying mandrel
36' vertical grooves on mandrel
41 tube expander and transport means
46 right roller for flying mandrel
48 left roller for flying mandrel
49 support arm for flying mandrel rollers
73 tube expander surface
86 film feed
115 expander module octagonal bracket
125 film tube
126 top vertical expansion finger
128 front expansion finger
129 bottom expansion finger
130 tube cutting apparatus
132 hot wire support arm
133 left tube cutter mounting bracket
134 tube cutter pivot arm
135 right tube cutter mounting bracket
136 hot wire
138 hot wire support
D gathered tubing
FIG. 8
16 film feed mechanism support
72 tube expander
73 tube expander surface
115 expander module octagonal bracket
124 back expansion finger
125 film tube
126 top expansion finger
128 front expansion finger
129 bottom expansion finger
130 tube cutting apparatus
131 pneumatic cylinder
132 support arm
133 mounting bracket
134 tube cutter pivot arm
135 bolt
136 hot wire 138 hot wire support
139 support bracket
140 piston rod
D gathered tubing
   FIG. 9
36 flying mandrel
36' vertical grooves on mandrel
38 left front vertical film feed roller
39 right front vertical film feed roller
41 tube expander and transport means
62 front feed roller pneumatic cylinder piston
63 first pivot pin
68 left back vertical film feed roller
69 right back vertical film feed roller
73 tube expander surface
75' vertical front and rear feed roller pulleys
86 film feed stop
124 back expansion finger
125 fill tube
128 front expansion finger
129 bottom expansion finger
136 hot wire
214 excess tubing
D gathered tubing
E' direction of outward expansion of expansion finger 124
   FIG. 10
41 tube expander and transport means
52 work product receiving table
124 back expansion finger
125 fill tube
128 front expansion finger
129 bottom expansion finger
208 push plate
211 plurality of casing tubes
E' direction of outward expansion of expansion finger 124
E" direction of outward expansion of expansion finger 128
K arrow indicating direction of movement of push plate to force plurality of casing tubes into fill tube
   FIG. 11
41 tube expander and transport means
52 work product receiving table
124 back expansion finger
125 fill tube
128 front expansion finger
129 bottom expansion finger
211 plurality of casing tubes
212 tubing package
215 hot wire sealing mechanism
E' direction of outward expansion of expansion finger 124
E" direction of outward expansion of expansion finger 128
H closed end of tubing package
J open end of tubing package
   FIG. 12
212 tubing package
216 perforation
H closed end of tubing package
   FIG. 13
43 intermediate horizontal support
45 bottom horizontal support
52 work product receiving table
53 left receiving table alignment rod
54 right receiving table alignment rod
126 top vertical expansion finger
128 front expansion finger
129 bottom expansion finger
215 sealing apparatus
218 top lateral member
219 bottom lateral member
223 perforator
224 mounting bracket
302 upper pneumatic cylinder
304 lower pneumatic cylinder
306 piston and cylinder
   FIG. 14
52 work product table
125 film tube
212 tubing package
223 perforator assembly
224 mounting bracket
225 pneumatic cylinder
226 piston
228 perforator housing
229 perforator wheel
230 perforator bearing
231 O-rings
232 perforator melting points
   FIG. 15
45 bottom horizontal support
215 hot wire sealing mechanism
219 bottom lateral member
220 supporting pneumatic cylinder
222 hot wire
304 lower pneumatic cylinder
   FIG. 16
140 conveyor
144 roller
146 lugs
150 stop
151 cylinder
153 flat member
154 first angled plate
155 first vertical plate
156 first upper limitation member
160 second vertical plate
161 second upper limitation member
162 base section
164 upright supports
165 upright supports
166 first adjustment wheel
167 first flat plate
168 second adjustment wheel
169 right-hand threaded shaft
170 product holder adjustment apparatus
171 shaft
171" sprocket
172 bottom slide bar
172' slide plate
175 universal joint
175' second threaded shaft
176 bottom slide bar
176' slide plate
178 through-bore
178' bearing
179 threaded shaft
180 front triangular member
181 inclined slot
182 vertical support
183 vertical slot
184 front riser member
184' cross bar
185 pintel
186 pintel
188 pintel
189 right "C" shaped member 189' left "C" shaped member
189" L-shaped bracket
190 table
191 left rear rubber foot
192 left front rubber foot
193 table
194 nut section
195 lower left adjustment shaft
196 lower right adjustment shaft
208 push-plate
209 member
210 guide rail
 FIG. 17
168 second adjustment wheel
178 through-bore
179 threaded shaft
180 front triangular member
182 vertical support
182' vertical support
184 front riser member
184' cross bar
185 pintel
186 pintel
188' pintel
189 right "C" shaped member
189' left "C" shaped member
190 table
193 table
195 lower left adjustment shaft
196 lower right adjustment shaft
198 rear adjustment shaft
199 rear adjustment shaft
200 rear triangular member
201 rear riser member
202 pintel
203 pintel
204 front shaker motor
205 rear shaker motor
 FIG. 18
154 first angled plate
167 first flat plate
168 second adjustment wheel
172' slide plate
176' slide plate
178 through-bore
179 threaded shaft
180 front triangular member
181 inclined slot
182 vertical support
183 vertical slot
184 front riser member
184' cross bar
185 pintel
186 pintel
188 pintel
189 right "C" shaped member
189' left "C" shaped member
190 table
191 left rear rubber foot
192 left front rubber foot
193 table
195 lower left adjustment shaft
196 lower right adjustment shaft
204 front shaker motor
206 half-casing dummy
208 push-plate
209 member FIG. 19
155 first vertical plate
156 first upper limitation member
160 second vertical plate
161 second upper limitation member
166 first adjustment wheel
169 right-hand threaded shaft
171 shaft
171' sprocket
172 bottom slide bar
172' slide plate
175 universal joint
176 bottom slide bar
176' slide plate
189 right "C" shaped member
189' left "C" shaped member
189" L-shaped bracket
190 table
191 left rear rubber foot
192 left front rubber foot
193 table
204 front shaker motor
208 pusher plate
209 member
 FIG. 20
155 first vertical plate
160 second vertical plate
162 base section
163 angled section
164 upright supports
165 upright supports
166 first adjustment wheel
167 first flat plate
168 second adjustment wheel
170 product holder adjustment apparatus
171 shaft
171' sprocket
171" sprocket
171'" chain drive
172 bottom slide bar
172' slide plate
176 bottom slide bar
176' slide plate
179 threaded shaft
189 right "C" shaped member
189' left "C" shaped member
204 front shaker motor
206 half-casing dummy
233 rear shaker motor
 FIG. 21
155 first vertical plate
156 first upper limitation member
156' slot
156" screws
160 second vertical plate
161 second upper limitation member
161' slots
161" screws
166 first adjustment wheel
168 second adjustment wheel
169 right-hand threaded shaft
170 product holder adjustment apparatus
171' sprocket
171" sprocket
171'" chain drive
172 bottom slide bar
172' slide plate 175 universal joint
176 bottom slide bar
176' slide plate
179 threaded shaft
204 first shaker motor
206 half-casing dummy
208 push-plate
209 member
233 second shaker motor
FIG. 22
50 casing strand transport mechanism
139 support bracket
140 conveyor
141 product holder
142 first inclined ramp
143 conveyor belt
144 conveyor roller
145 conveyor drive roller
146 conveyor lugs
148 sensor
149 ramp
150 stop
151 stop cylinder
152 stop cylinder piston
153 flat member
154 first angled plate
155 first vertical plate
156 first upper limitation member
158 second flat plate
159 third flat plate
160 second vertical plate
161 second upper limitation member
162 base section
163 angled section
164 upright supports
165 upright supports
167 first flat plate
206 half-casing dummy
F direction of travel of belt 143
G direction of travel of strands down ramp 149
S plurality of casing strands
FIG. 23
139 single casing stick
S plurality of casing strands Although the present invention has been described herein with a certain degree of particularity, it is to be understood that the present disclosure has been made as an exemplification of the preferred embodiment of the present invention, and the scope thereof is not considered limited by that description, but rather, is defined by what is hereinafter claimed.

What is claimed is:

1. A machine for making a package of food casing strands, wherein said package has a hexagonal-like cross section, comprising:

a product holder for initially holding a plurality of said strands in a configuration having a hexagonal-like cross section, wherein said holder has an opening therein for admitting said strands into said holder;

means for transporting said strands to said holder and for depositing said strands into said opening;

shaker means for shaking said holder at predetermined times to ensure that said plurality of strands settle into said holder in said configuration having a hexagonal-like cross section;

means for measuring and cutting a predetermined amount of stretch film, where said stretch film is a closed loop used to encase said package of food casing strands;

means for stretching and holding said stretch film into a shape of a polygon having a perimeter which is larger than the perimeter of said holder;

means for moving said stretched film into a position proximate said holder;

means for pushing all of said strands out of said holder and into said stretched closed loop of film; and, means for releasing said stretched film, wherein said film then relaxes about said plurality of strands to form said package of food casing strands.

2. A machine as recited in claim 1 wherein said product holder is adjustable to form packages of different sizes.

3. A machine as recited in claim 1 wherein said means for transporting is a conveyor.

4. A machine as recited in claim 1, and further including means for perforating said package of food casing strands.

5. A machine as recited in claim 1, and further including means for sealing at least one end of said package of food casing strands.

6. A machine as recited in claim 2 wherein said strands have a cross-section which is essentially round.

7. A method for making a package of food casing strands, wherein said package has a hexagonal-like cross section, comprising:

transporting a plurality of said strands into a holder having an opening therein for admitting said strands and for holding them in a hexagonal-like cross section;

shaking said holder at predetermined times to ensure that said plurality of strands settle into said holder in a configuration having a hexagonal-like cross section;

measuring and cutting a predetermined amount of stretch film, where said stretch film is a closed loop used to encase said food casing strands within said holder;

stretching and holding said stretch film into a shape of a polygon having a perimeter which is larger than the perimeter of said holder;

moving said stretched film into a position proximate said holder;

pushing all of the strands out of said holder and into said stretched closed loop of film; and, releasing said stretched film, wherein said film then relaxes about said plurality of strands to form said package of food casing strands.

8. A method as recited in claim 7 and further including the step of perforating said package of food casing strands.

9. A method as recited in claim 7 and further including the step of sealing at least one end of said package of food casing strands.

* * * * *